US008661455B2

(12) United States Patent
Mejdrich et al.

(10) Patent No.: US 8,661,455 B2
(45) Date of Patent: *Feb. 25, 2014

(54) PERFORMANCE EVENT TRIGGERING THROUGH DIRECT INTERTHREAD COMMUNICATION ON A NETWORK ON CHIP

(75) Inventors: Eric O. Mejdrich, Rochester, MN (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 754 days.

This patent is subject to a terminal disclaimer.

(21) Appl. No.: 12/427,090

(22) Filed: Apr. 21, 2009

(65) Prior Publication Data

US 2010/0269123 A1  Oct. 21, 2010

(51) Int. Cl.
*G06F 3/00* (2006.01)

(52) U.S. Cl.
USPC .............................. 719/318; 719/313; 719/320

(58) Field of Classification Search
None
See application file for complete search history.

(56) References Cited

U.S. PATENT DOCUMENTS

| | | | |
|---|---|---|---|
| 6,058,393 A | 5/2000 | Meier et al. | |
| 6,714,976 B1 | 3/2004 | Wilson et al. | |
| 7,146,607 B2 | 12/2006 | Nair et al. | |
| 7,962,314 B2 | 6/2011 | Chernoff | |
| 2005/0203988 A1* | 9/2005 | Nollet et al. | 709/201 |
| 2006/0031569 A1* | 2/2006 | Desic et al. | 709/238 |
| 2007/0055664 A1* | 3/2007 | Michaeli et al. | 707/6 |
| 2008/0256339 A1* | 10/2008 | Xu et al. | 712/216 |
| 2009/0125574 A1 | 5/2009 | Mejdrich et al. | |
| 2009/0323540 A1* | 12/2009 | Goossens et al. | 370/252 |
| 2010/0169896 A1* | 7/2010 | Bennebroek et al. | 719/318 |
| 2010/0191814 A1 | 7/2010 | Heddes et al. | |

OTHER PUBLICATIONS

"An Analytical Model for Reliability Evaluation of NoC Architectures", Atede Dalirsani, 2007, pp. 1-6.*
"Exploring High-Dimensional Topologies for NoC Design Through an Integrated Analysis and Synthesis Framework", Gilabert, 2008, pp. 1-10.*
"A GALs Infrastructure for a Massively Parallel Multiprocessor", Plana, 2007, pp. 1-10.*
U.S. Appl. No. 12/117,875, entitled "Monitoring Software Pipeline Performance on a Network on Chip," filed May 9, 2008 by Russell D. Hoover et al.

* cited by examiner

*Primary Examiner* — Tuan Dao
(74) *Attorney, Agent, or Firm* — Kevin D. Kehe; James R. Nock

(57) ABSTRACT

Performance event triggering through direct interthread communication ('DITC') on a network on chip ('NOC'), the NOC including integrated processor ('IP') blocks, routers, memory communications controllers, and network interface controllers, with each IP block adapted to a router through a memory communications controller and a network interface controller, where each memory communications controller controlling communications between an IP block and memory, and each network interface controller controlling inter-IP block communications through routers, including enabling performance event monitoring in a selected set of IP blocks distributed throughout the NOC, each IP block within the selected set of IP blocks having one or more event counters; collecting performance results from the one or more event counters; and returning performance results from the one or more event counters to a destination repository, the returning being initiated by a triggering event occurring within the NOC.

14 Claims, 6 Drawing Sheets

US 8,661,455 B2

PERFORMANCE EVENT TRIGGERING THROUGH DIRECT INTERTHREAD COMMUNICATION ON A NETWORK ON CHIP

BACKGROUND OF THE INVENTION

1. Field of the Invention

The field of the invention is data processing, or, more specifically apparatus and methods for performance event triggering though direct interthread communication on a network on chip ('NOC').

2. Description of Related Art

There are two widely used paradigms of data processing; multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

Methods, apparatus, and computer program products for a network on chip ('NOC') that executes performance event triggering through direct interthread communication ('DITC') and includes integrated processor ('IP') blocks, routers, memory communications controllers, and network interface controllers, with each IP block adapted to a router through a memory communications controller and a network interface controller, where each memory communications controller controlling communications between an IP block and memory, and each network interface controller controlling inter-IP block communications through routers, including enabling performance event monitoring in a selected set of IP blocks distributed throughout the NOC, each IP block within the selected set of IP blocks having one or more event counters; collecting performance results from the one or more event counters; and returning performance results from the one or more event counters to a destination repository, the returning being initiated by a triggering event occurring within the NOC.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
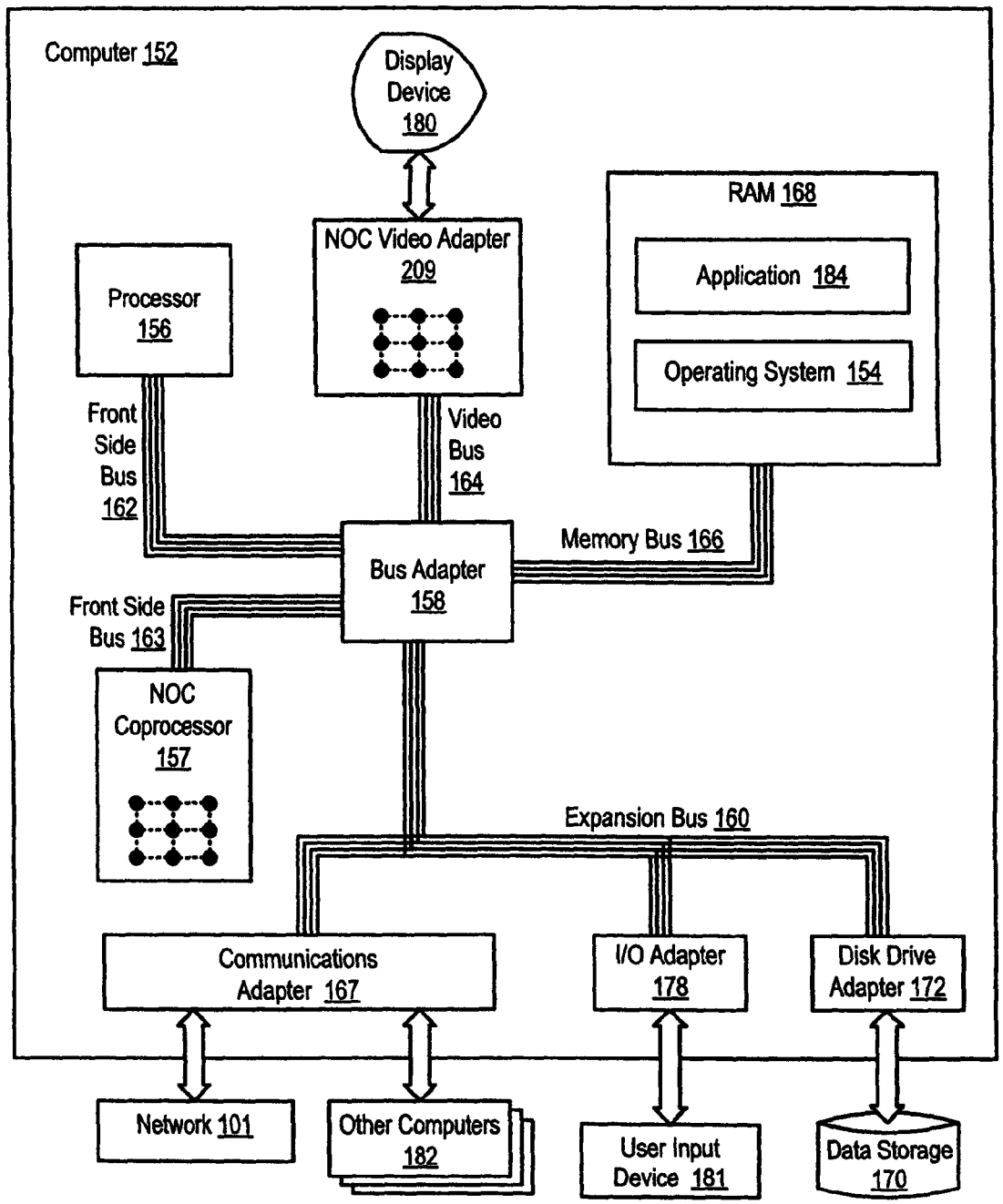
FIG. 1 sets forth a block diagram of automated computing machinery comprising an exemplary computer useful in data processing with a NOC according to embodiments of the present invention.

Exemplary apparatus and methods for data processing with a NOC in accordance with the present invention are described with reference to the accompanying drawings, beginning with FIG. 1. FIG. 1 sets forth a block diagram of automated computing machinery comprising an exemplary computer (152) useful in data processing with a NOC according to embodiments of the present invention. The computer (152) of FIG. 1 includes at least one computer processor (156) or 'CPU' as well as random access memory (168) ('RAM') which is connected through a high speed memory bus (166) bus adapter (158), and a front side bus (162) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful data processing with a NOC according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162).

The example NOC coprocessor (157) is connected to processor (156) through bus adapter (158), and front side buses (162 and 163). The NOC coprocessor of FIG. 1 is optimized to accelerate particular data processing tasks at the behest of the main processor (156).

The example NOC video adapter (209) and NOC coprocessor (157) of FIG. 1 each include a NOC according to embodiments of the present invention, including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. The NOC video adapter and the NOC coprocessor are optimized for programs that use parallel processing and also require fast random access to shared memory. The details of the NOC structure and operation are discussed below with reference to FIGS. 2-4.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for data processing with a NOC according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (101). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired data communications network communications, and 802.11 adapters for wireless data communications network communications.

Figure 2:
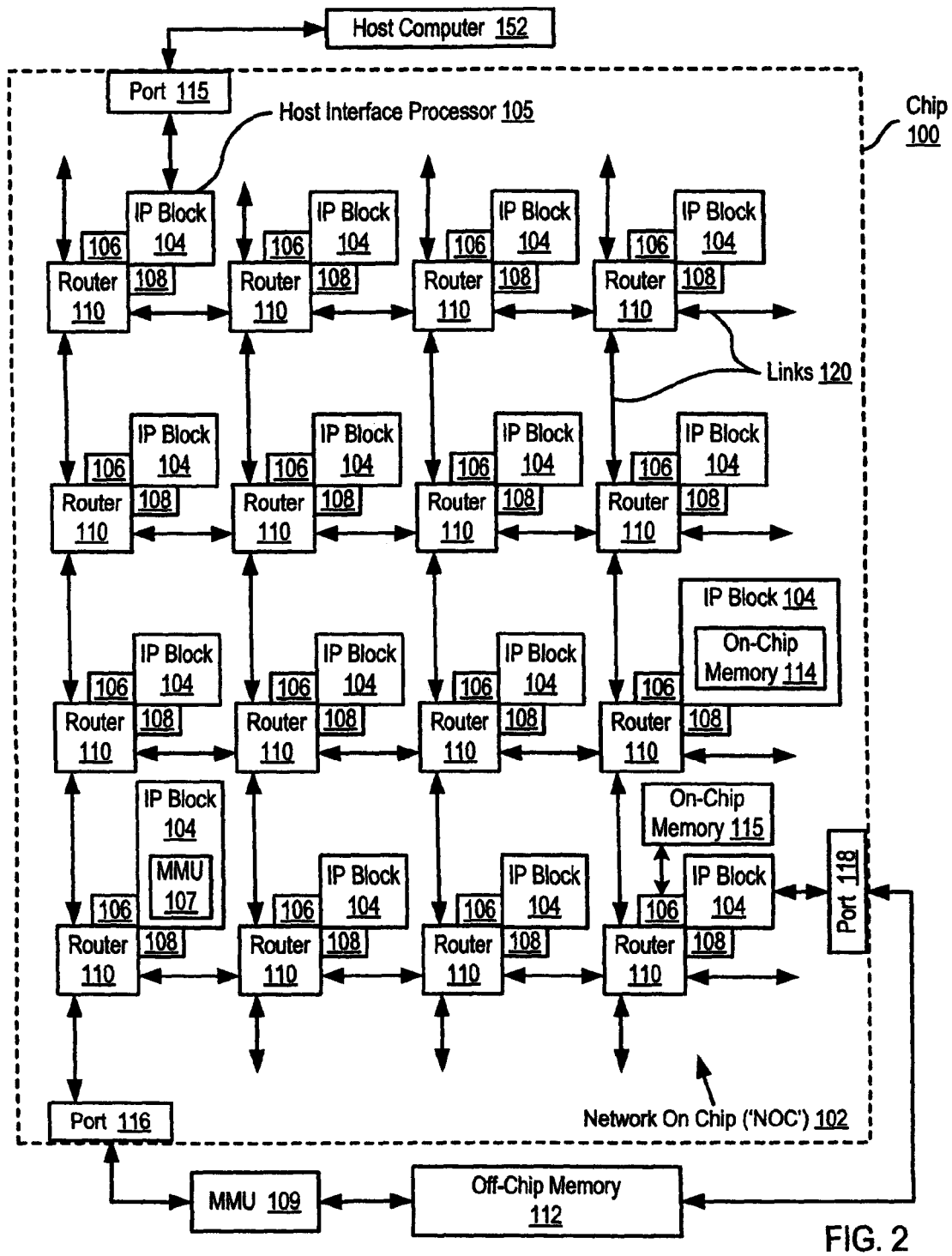
FIG. 2 sets forth a functional block diagram of an example NOC according to embodiments of the present invention.

For further explanation, FIG. 2 sets forth a functional block diagram of an example NOC (102) according to embodiments of the present invention. The NOC in the example of FIG. 1 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packets structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link is bi-directional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory-addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (107, 109), illustrating two alternative memory architectures for NOCs according to embodiments of the present invention. MMU (107) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU (109) means that all processors in all IP blocks of the NOC can operate in virtual memory address space, with all conversions to physical addresses of the off-chip memory handled by the off-chip MMU (109).

In addition to the two memory architectures illustrated by use of the MMUs (107, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

Figure 3:
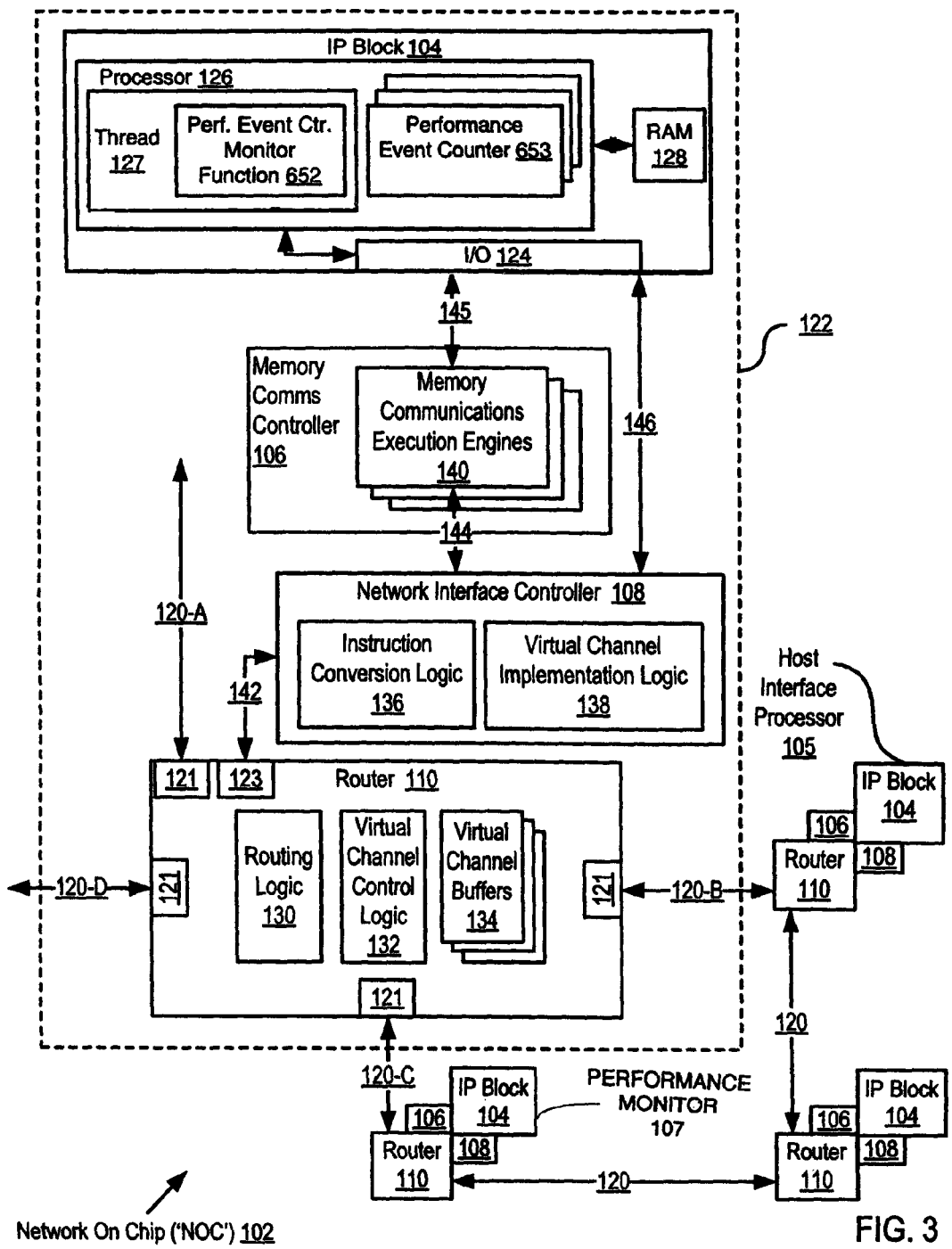
FIG. 3 sets forth a functional block diagram of a further example NOC according to embodiments of the present invention.

For further explanation, FIG. 3 sets forth a functional block diagram of a further example NOC according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) comprising an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the NOC (102) of FIG. 3, IP block (104) may be configured to initialize, update and monitor one or more performance event counters (653) during normal operation of the NOC. Performance event counters (653) are capable of monitoring IP block (104) for a wide variety of performance metrics, including but not limited to: the number of cache misses, number of cache invalidates, number of branch miss predicts, and others as will occur to those of ordinary skill in the art. IP block (104) also includes a performance event counter monitor function (652) which provides control over establishing, initializing, updating, monitoring, and deleting the one or more performance event counters (653) within the IP block. Performance event counter monitor function (652) also reports, when triggered, performance event counter (653) results to at least one of a variety of destination repositories, including but not limited to: a RAM (128) within the IP block (104), a memory external to the IP block via the memory communications controller (106), the host interface processor (FIG. 2, element 105), and/or a performance monitor IP block (i.e., MMU) (107).

Performance event counter monitor function (652) also monitors incoming network packets arriving at IP block (104) for information regarding the configuration and initialization of performance event counters (653) within the IP block. In one embodiment, a standard network packet transmitted to IP block (104) may contain an event counter initialization bit in a specified location within the packet, which in turn triggers the performance event counter monitor function (652) to then initialize the one or more event counters (653) within the IP block. In an alternate embodiment, a specially formatted performance event counter configuration packet transmitted to IP block (104) may trigger the performance event counter monitor function (652) to perform a variety of activities, including but not limited to: initializing one or more performance event counters (653) within the IP block, enabling or disabling each of the one or more performance event counters (653), and/or configuring a new or existing performance event counter according to information provided in the payload of the specially formatted performance event counter configuration packet.

In one embodiment of the present invention, a special collection network packet may be routed through one or more IP blocks (104) within the NOC (102) in order to collect performance event counter results. This special collection packet's payload comprises a collection of performance event counter placeholders associated with the IP blocks (104) containing the performance event counters (653) for which results are desired. As the special collection packet is routed through each of the IP blocks (104) of interest, the performance event configuration monitor function (652) within each of the IP blocks detects the presence of a special collection packet, then triggers the loading of performance event counters within the IP block into the appropriate placeholders of the special collection packet. The special collection packet is then forwarded to either another IP block for collection of its performance event counter results, or alternatively if all placeholders are full in the special collection packet, the special collection packet is forwarded to the destination repository.

In another embodiment of the present invention, performance event counter monitor function (652) within an IP block (104) continuously monitors each of the one or more performance event counters (653) residing within the IP block to determine if a predefined threshold count associated with a particular performance event counter (653) has been reached. If so, performance event counter monitor function (652) generates a network packet containing the performance event counter results from the monitored performance event counter (653) that has reached the predefined threshold count, and the network packet is dispatched to the destination repository. Upon dispatching the packet, the monitored performance event counter (653) may then be reset. In certain instances, it may be desirable to send a message packet every time a particular performance event counter (653) is incremented. In this instance, the predefined threshold count associated with the desired performance event counter (653) may then set to "1". The predefined thresholds associated with each of the performance event counters (653) in an IP block (104) may be provided to the IP block via the specially formatted performance event counter configuration packet discussed above.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through its I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x,y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Figure 4:
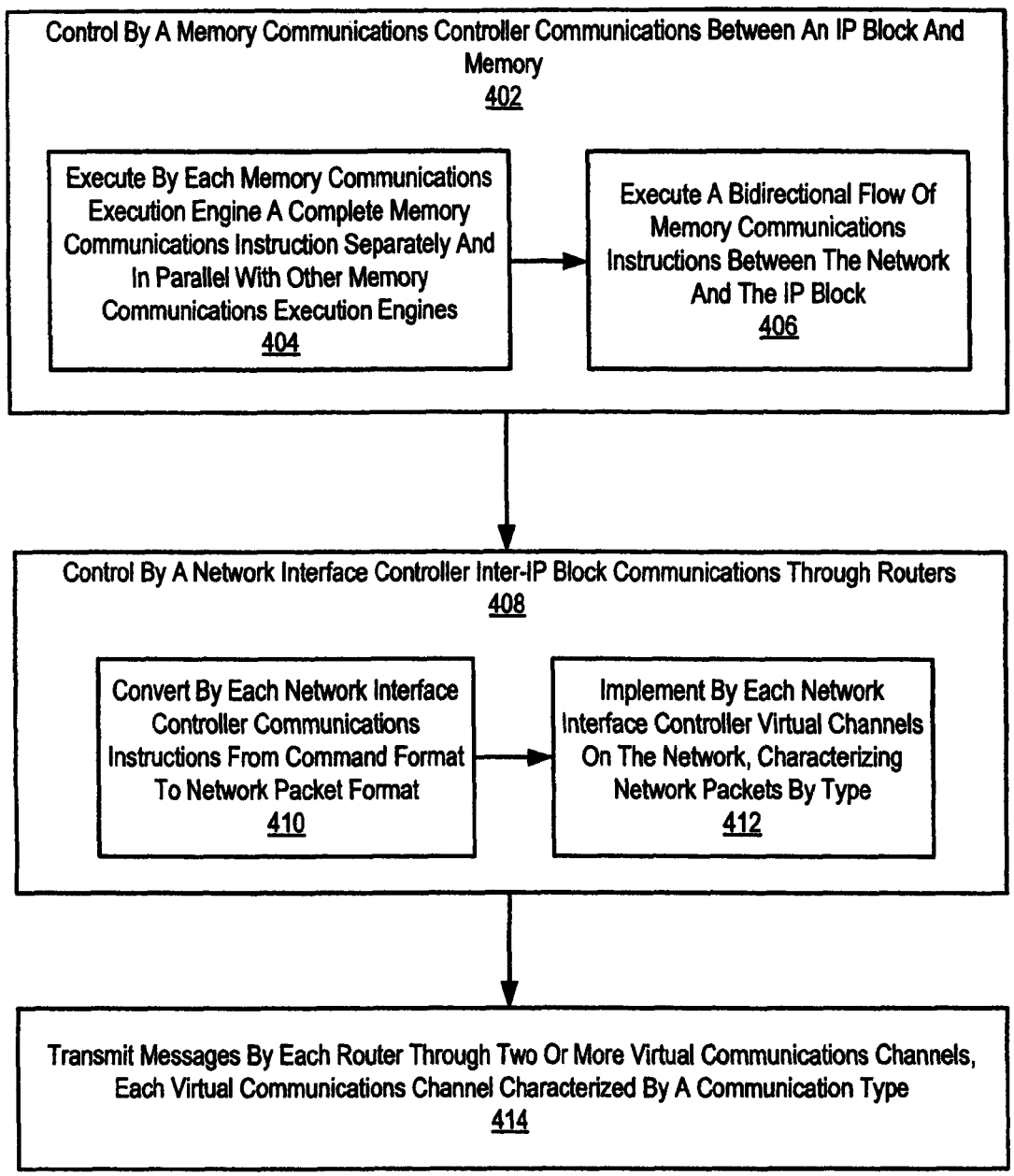
FIG. 4 sets forth a flow chart illustrating an exemplary method for data processing with a NOC according to embodiments of the present invention.

For further explanation, FIG. 4 sets forth a flow chart illustrating an exemplary method for data processing with a NOC according to embodiments of the present invention. The method of FIG. 4 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 4, each IP block may be implemented as a reusable unit of synchronous or asynchronous logic design used as a building block for data processing within the NOC.

The method of FIG. 4 includes controlling (402) by a memory communications controller (106 on FIG. 3) communications between an IP block and memory. In the method of FIG. 4, the memory communications controller includes a plurality of memory communications execution engines (140 on FIG. 3). Also in the method of FIG. 4, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 4, memory communications instructions may include translation lookaside buffer control instructions, cache control instructions, barrier instructions, memory load instructions, and memory store instructions. In the method of FIG. 4, memory may include off-chip main RAM, memory connected directly to an IP block through a memory communications controller, on-chip memory enabled as an IP block, and on-chip caches.

The method of FIG. 4 also includes controlling (408) by a network interface controller (108 on FIG. 3) inter-IP block communications through routers. In the method of FIG. 4, controlling (408) inter-IP block communications also includes converting (410) by each network interface controller communications instructions from command format to network packet format and implementing (412) by each network interface controller virtual channels on the network, including characterizing network packets by type.

The method of FIG. 4 also includes transmitting (414) messages by each router (110 on FIG. 3) through two or more virtual communications channels, where each virtual communications channel is characterized by a communication type. Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

On a NOC according to embodiments of the present invention, computer software applications may be implemented as software pipelines. For further explanation, FIG. 5 sets forth a data flow diagram illustrating operation of an example pipeline (600). The example pipeline (600) of FIG. 5 includes three stages (602, 604, 606) of execution. A software pipeline is a computer software application that is segmented into a set of modules or 'stages' of computer program instructions that cooperate with one another to carry out a series of data processing tasks in sequence. Each stage in a pipeline is composed of a flexibly configurable module of computer program instructions identified by a stage 1D with each stage executing on a thread of execution on an IP block on a NOC (102). The stages are 'flexibly configurable' in that each stage may support multiple instances of the stage, so that a pipeline may be scaled by instantiating additional instances of a stage as needed depending on workload.

Figure 5:
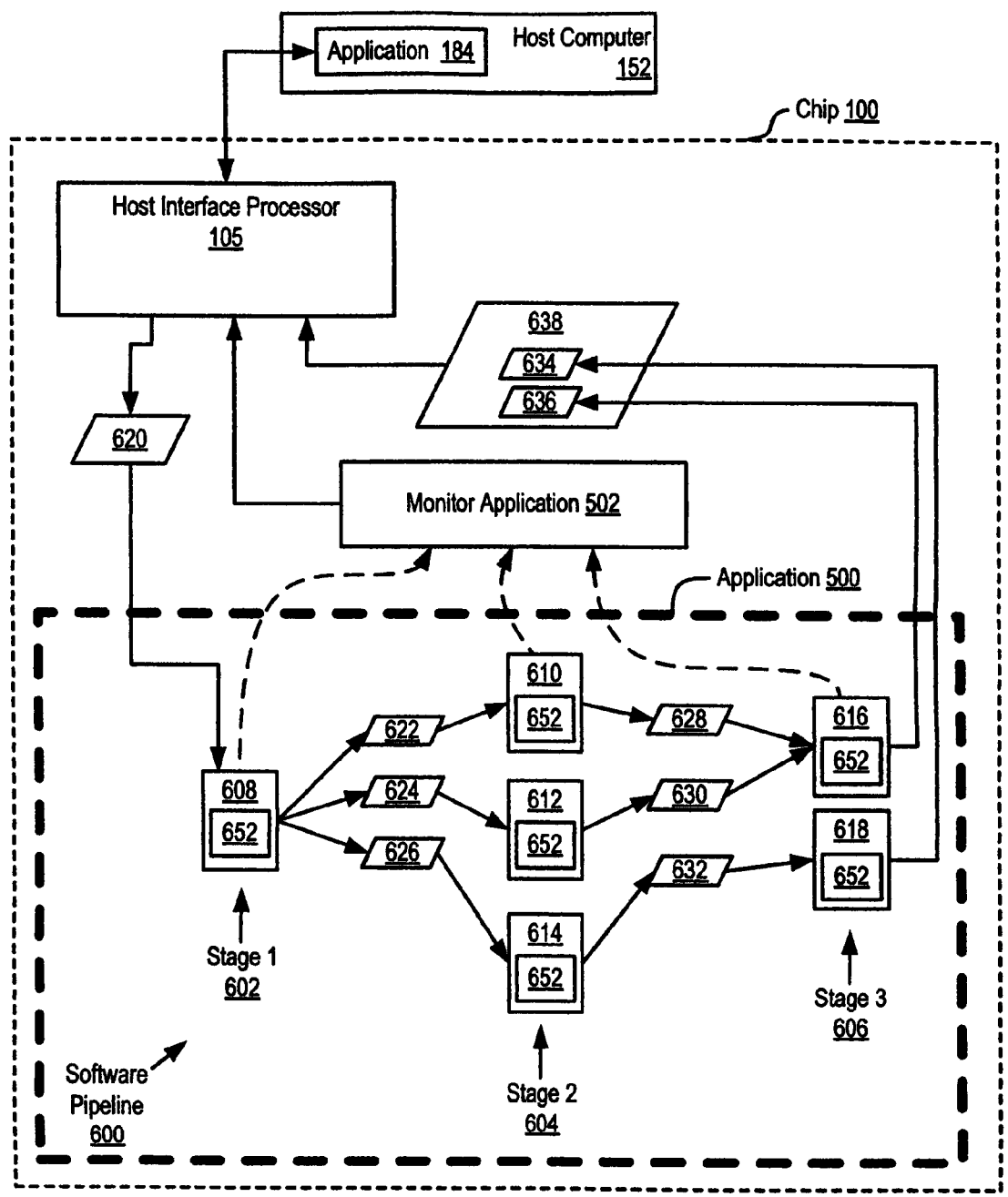
FIG. 5 sets forth a data flow diagram an example software pipeline on a NOC according to embodiments of the present invention.

Because each stage (602, 604, 606) is implemented by computer program instructions executing on an IP block (104 on FIG. 2) of a NOC (102 on FIG. 2), each stage (602, 604, 606) is capable of accessing addressed memory through a memory communications controller (106 on FIG. 2) of an IP block—with memory-addressed messages as described above. At least one stage, moreover, sends network-address based communications among other stages, where the network-address based communications maintain packet order. In the example of FIG. 5, both stage 1 and stage 2 send network-address based communications among stages, stage 1 sending network address based communications (622-626) from stage 1 to stage 2, stage 2 sending network addressed communications (628-632) to stage 3.

The network-address based communications (622-632) in the example of FIG. 5 maintain packet order. Network-address based communications among stages of a pipeline are all communications of a same type which therefore flow through the same virtual channel as described above. Each packet in such communications is routed by a router (110 on FIG. 3) according to embodiments of the present invention, entering and leaving a virtual channel buffer (134 on FIG. 3) in sequence, in FIFO order, first-in, first-out, thereby maintaining strict packet order. Maintaining packet order in network address based communications according to the present invention provides message integrity because the packets are received in the same order in which they are—eliminating the need for tracking packet sequence in a higher layer of the data communication protocol stack. Contrast the example of TCP/IP where the network protocol, that is, the Internet Protocol, not only makes no undertaking regarding packet sequence, but in fact normally does deliver packets out of order, leaving it up to the Transmission Control Protocol in a higher layer of the data communication protocol stack to put the packets in correct order and deliver a complete message to the application layer of the protocol stack.

Each stage implements a producer/consumer relationship with a next stage. Stage 1 receives work instructions and work piece data (620) through a host interface processor (105) from an application (184) running on a host computer (152). Stage 1 carries out its designated data processing tasks on the work piece, produces output data, and sends the produced output data (622, 624, 626) to stage 2, which consumes the produced output data from stage 1 by carrying out its designated data processing tasks on the produced output data from stage 1, thereby producing output data from stage 2, and sends its produced output data (628, 630, 632) to stage 3, which in turn consumes the produced output data from stage 2 by carrying out its designated data processing tasks on the produced output data from stage 2, thereby producing output data from stage 3, which then stores its produced output data (634, 636) in an output data structure (638) for eventual return through the host interface processor (105) to the originating application program (184) on the host computer (152).

The return to the originating application program is said to be 'eventual' because quite a lot of return data may need to be calculated before the output data structure (638) is ready to return. The pipeline (600) in this example is represented with only six instances (622-632) in three stages (602-606). Many pipelines according to embodiments of the present invention, however, may include many stages and many instances of stages. In an atomic process modeling application, for example, the output data structure (638) may represent the state at a particular nanosecond of an atomic process containing the exact quantum state of billions of sub-atomic particles, each of which requires thousands of calculations in various stages of a pipeline. Or in a video processing application, for a further example, the output data structure (638) may represent a video frame composed of the current display state of thousands of pixels, each of which requires many calculations in various stages of a pipeline.

Each instance (622-632) of each stage (602-606) of the pipeline (600) is implemented as an application-level module of computer program instructions executed on a separate IP block (104 on FIG. 2) on a NOC (102 on FIG. 2). Each stage is assigned to a thread of execution on an IP block of a NOC. Each stage is assigned a stage 1D, and each instance of a stage is assigned an identifier. The pipeline (600) is implemented in this example with one instance (608) of stage 1, three instances (610, 612, 614) of stage 2, and two instances (616, 618) of stage 3. Stage 1 (602, 608) is configured at start-up by the host interface processor (105) with the number of instances of stage 2 and the network location of each instance of stage 2. Stage 1 (602, 608) may distribute its resultant workload (622, 624, 626) by, for example, distributing it equally among the instances (610-614) of stage 2. Each instance (610-614) of stage 2 is configured at start up with the network location of each instance of stage 3 to which an instance of stage 2 is authorized to send its resultant workload. In this example, instances (610, 612) are both configured to send their resultant workloads (628, 630) to instance (616) of stage 3, whereas only one instance (614) of stage 2 sends work (632) to instance (618) of stage 3. If instance (616) becomes a bottleneck trying to do twice the workload of instance (618), an additional instance of stage 3 may be instantiated, even in real time at run time if needed.

In the example of FIG. 5, where a computer software application (500) is segmented into stages (602-606), each stage may be configured with a stage 1D for each instance of a next stage. That a stage may be configured with a stage 1D means that a stage is provided with an identifier for each instance of a next stage, with the identifier stored in memory available to the stage. Configuring with identifiers of instances of next stage can include configuring with the number of instances of a next states as well as the network location of each instance of a next stage, as mentioned above. The single instance (608) of stage 1, in the current example, may be configured with a stage identifier or 'ID' for each instance (610-614) of a next stage, where the 'next stage' for stage 1, of course, is stage 2. The three instances (610-614) of stage 2 each may be configured with a stage 1D for each instance (616, 618) of a next stage, where the next stage for stage 2 naturally is stage 3. And so on, with stage 3 in this example representing the trivial case of a stage having no next stage, so that configuring such a stage with nothing represents configuring that stage with the stage 1D of a next stage.

Configuring a stage with IDs for instances of a next stage as described here provides the stage with the information needed to carry out load balancing across stages. In the pipeline of FIG. 5, for example, where a computer software application (500) is segmented into stages, the stages are load balanced with a number of instances of each stage in dependence upon the performance of the stages. Such load balancing can be carried out, for example, by monitoring performance event counters within the stages and instantiating a number of instances of each stage in dependence upon the performance event counts within the one or more of the stages. Monitoring the performance event counters within stages of the pipeline can be carried out by configuring each stage instance to report performance statistics (such as performance event counters (653)) to a performance event counter monitoring application (502) that in turn is installed and running on another thread of execution on an performance monitor IP block (107) or host interface processor (105). Such reporting of performance event counts (653) may be triggered when the performance event counter monitor function (652) determines that a predefined threshold has been reached. Alternatively, a performance event counter collection packet may be routed through a selected set of IP blocks (104) within the NOC (i.e., the pipeline (600)) which will then route the event counter results back to the performance event counter monitoring application (502) for analysis.

In order to successfully collect performance event counter results in a multi-stage, multi-instance pipelined application via a performance event counter collection packet, the packet must carry along a stage instance identifier associated with the performance event counter (653). This stage instance identifier can be included in the packet header information of the performance event counter collection packet.

Instantiating a number of instances of each stage in dependence upon the event counts associated of one or more of the stages can be carried out by instantiating, by a host interface processor (105), a new instance of a stage when monitored performance event counters (653) indicate a need for a new instance. As mentioned, instances (610, 612) in this example are both configured to send their resultant workloads (628, 630) to instance (616) of stage 3, whereas only one instance (614) of stage 2 sends work (632) to instance (618) of stage 3. If instance (616) becomes a bottleneck trying to do twice the workload of instance (618), an additional instance of stage 3 may be instantiated, even in real time at run time if needed.

Figure 6:
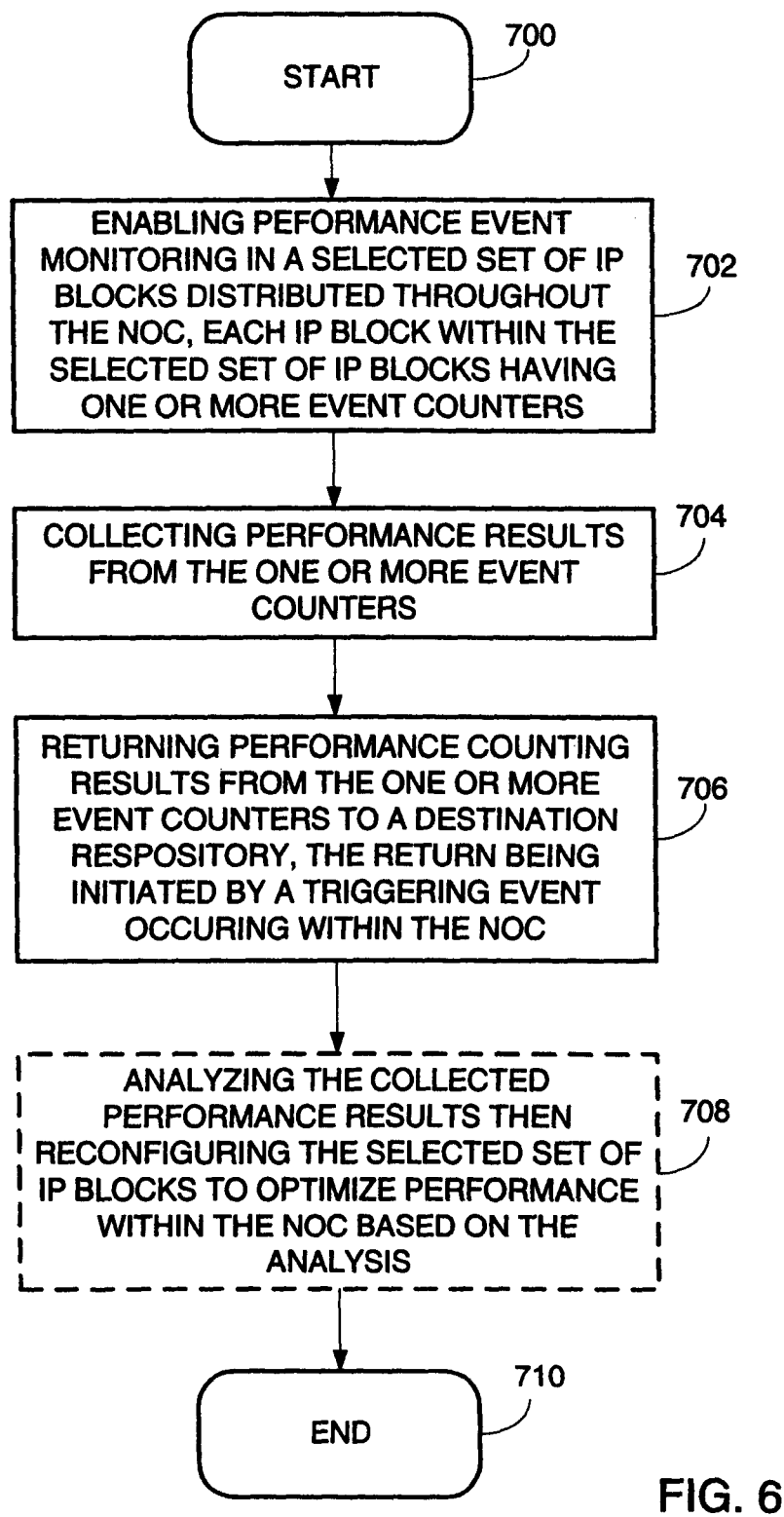
FIG. 6 sets forth a flow chart illustrating an exemplary method of performance event triggering through direct interthread communication on a NOC according to embodiments of the present invention.

For further explanation, FIG. 6 sets forth a flow chart illustrating an exemplary method of software pipelining on a NOC according to embodiments of the present invention. The method of FIG. 6 is implemented on a NOC similar to the ones described above in this specification, a NOC (102 on FIG. 2) that is implemented on a chip (100 on FIG. 2) with IP blocks (104 on FIG. 2), routers (110 on FIG. 2), memory communications controllers (106 on FIG. 2), and network interface controllers (108 on FIG. 2). Each IP block (104 on FIG. 2) is adapted to a router (110 on FIG. 2) through a memory communications controller (106 on FIG. 2) and a network interface controller (108 on FIG. 2). In the method of FIG. 6, each IP block is implemented as a reusable unit of synchronous or asynchronous logic design used as a building block for data processing within the NOC.

The method of FIG. 6 begins at block (700). At block (702), performance event monitoring in a selected set of IP blocks distributed throughout the NOC is enabled. Each block within the selected set of IP blocks includes one or more event counters. At block (704), performance results from the one or more event counters are collected. At block (706), performance counting results from the one or more event counters are returned to a destination repository, wherein the returning of the performance counting results is initiated by a triggering event occurring within the NOC. In optional block (708), the performance counting results are analyzed, and the selected set of IP blocks are reconfigured to optimize performance within the NOC based on the analysis. The method ends at block (710).

Exemplary embodiments of the present invention are described largely in the context of a fully functional computer system for performance event triggering through direct interthread communication on a NOC. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of performance event triggering through direct interthread communication ('DITC'), the method implemented on a network on chip ('NOC'), the NOC comprising integrated processor ('IP') blocks distributed throughout the NOC, routers, memory communications controllers, and network interface controller, each IP block adapted to a router through a memory communications controller and a network interface controller, each memory communications controller controlling communication between an IP block and memory, and each network interface controller controlling inter-IP block communications through routers, the method comprising:

enabling performance event monitoring for performance-specific intrablock events occurring within an IP block of the IP blocks distributed throughout the NOC, each IP block using one or more event counters positioned within the IP block to count the performance-specific intrablock events;

collecting performance results from the one or more event counters;

returning performance counting results from the one or more event counters to a destination repository, the returning being initiated by a triggering event occurring within the NOC and the returning including routing a collection packet through the IP block of the IP blocks, wherein the IP block of the IP blocks adds its performance counting results to the collection packet; and wherein if the collection packet is parallelized at a pipeline stage within the IP block of the IP blocks, a stage instance identifier is associated with a stage instance result, the stage instance identifier also being added with its associated stage instance result to the collection packet.

2. The method of claim 1 wherein the step of enabling performance event monitoring further comprises triggering initialization of the one or more event counters residing within the IP block of the IP blocks via a predefined initialization bit residing in a standard network packet transmitted to the IP block of the IP blocks.

3. The method of claim 1 wherein the step of enabling performance event monitoring further comprises triggering the initialization of the one or more event counters residing within the IP block of the IP blocks via a specially formatted network packet transmitted to the IP block of the IP blocks.

4. The method of claim 3 wherein the specially formatted network packet includes configuration information for configuring the one or more event counters.

5. The method of claim 1, wherein the step of collecting performance results from the one or more event counters further comprises monitoring each of the event counters to determine if the counter has reached a predefined threshold value, and if so, generating a trigger to return the collected performance results to a destination repository.

6. The method of claim 1, further comprising steps of analyzing the collected performance results then reconfiguring the IP block of the IP blocks to optimize performance within the NOC based on the analysis.

7. The method of claim 1, wherein performance-specific intrablock events include cache misses, cache invalidates, and branch miss predicts, without respect to configuration events of the IP block of the IP blocks.

8. A network on chip ('NOC'), the NOC comprising integrated processor ('IP') blocks distributed throughout the NOC, routers, memory communications controllers, and network interface controller, each IP block adapted to a router through a memory communications controller and a network interface controller, each memory communications controller controlling communication between an IP block and memory, and each network interface controller controlling inter-IP block communications through routers, the NOC further comprising:

one or more performance event counters residing within an IP block of the IP blocks distributed within the NOC for monitoring performance-specific intrablock events occurring within the IP block and for counting the performance-specific intrablock events;

an event count processing thread residing within the IP block of the IP blocks within the NOC;

a performance event counter monitor residing within the IP block of the IP blocks associated with the one or more performance event counters, wherein upon occurrence of a triggering event detected by the performance event counter monitor, the performance event counter monitor is configured to dispatch event counter results to the event count processing thread by routing a collection packet through the IP block of the IP blocks, wherein the IP block of the IP blocks adds its performance counting results to the collection packet; and wherein if the collection packet is parallelized at a pipeline stage within the IP block of the IP blocks, the performance event counter monitor is configured to associate a stage instance identifier with a stage instance result and add the stage instance identifier with its associated stage instance result to the collection packet.

9. The NOC of claim 8 wherein the one or more performance event counters are initialized via a standard network packet transmitted to the IP block of the IP blocks, wherein a predefined initialization bit at a fixed location within the standard network packet is set to perform the initialization.

10. The NOC of claim 8 wherein the one or more performance event counters are initialized by a specially formatted network packet transmitted to the IP block of the IP blocks.

11. The NOC of claim 10 wherein the specially formatted network packet includes configuration information for setup of the one or more performance event counters.

12. The NOC of claim 8, wherein the triggering event detected by the performance event counter monitor in the IP block of the IP blocks is the arrival of a collection packet, wherein the performance event counter results are added to the collection packet at the IP block of the IP blocks upon its arrival.

13. The NOC of claim 8, wherein if the performance event counter monitor within the IP block of the IP blocks determines that at least one of the one or more performance event counters has reached a predefined threshold level, a triggering event is generated.

14. The NOC of claim 8, wherein the event counter thread further includes an analyzer for analyzing the performance event counter results and reconfiguring the IP block of the IP blocks to optimize performance within the NOC based on the analysis.

* * * * *